United States Patent
Chang et al.

(10) Patent No.: US 12,397,275 B2
(45) Date of Patent: Aug. 26, 2025

(54) CDR REACTOR HAVING MULTILAYERED CATALYST LAYER ARRANGEMENT FOR PREVENTING CATALYST DEACTIVATION

(71) Applicant: KOREA RESEARCH INSTITUTE OF CHEMICAL TECHNOLOGY, Daejeon (KR)

(72) Inventors: Tae Sun Chang, Daejeon (KR); Iljeong Heo, Daejeon (KR); Jung Hyun Park, Daejeon (KR); Beom Sik Kim, Daejeon (KR); Ji Hoon Park, Daejeon (KR); Jin Hee Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 975 days.

(21) Appl. No.: 17/296,152

(22) PCT Filed: Nov. 22, 2019

(86) PCT No.: PCT/KR2019/016143
§ 371 (c)(1),
(2) Date: May 21, 2021

(87) PCT Pub. No.: WO2020/106100
PCT Pub. Date: May 28, 2020

(65) Prior Publication Data
US 2022/0016590 A1    Jan. 20, 2022

(30) Foreign Application Priority Data
Nov. 23, 2018  (KR) .................. 10-2018-0146162

(51) Int. Cl.
*B01J 8/02*    (2006.01)
*B01J 8/00*    (2006.01)
(Continued)

(52) U.S. Cl.
CPC ............. *B01J 8/0285* (2013.01); *B01J 8/008* (2013.01); *B01J 23/755* (2013.01); *B01J 35/19* (2024.01);
(Continued)

(58) Field of Classification Search
CPC ........ B01J 8/0285; B01J 8/008; B01J 23/755; B01J 35/19; B01J 8/0453; B01J 2208/027;
(Continued)

(56) References Cited

U.S. PATENT DOCUMENTS

| | | |
|---|---|---|
| 2010/0038593 A1 | 2/2010 | He et al. |
| 2016/0002036 A1* | 1/2016 | Kolaczkowski ......... B01J 8/062 422/162 |

FOREIGN PATENT DOCUMENTS

| | | |
|---|---|---|
| JP | 6-226099 A | 8/1994 |
| JP | 2003-212507 A | 7/2003 |

(Continued)

OTHER PUBLICATIONS

Buchmeiser et al. (Current and Forthcoming Applications of ROMP-Derived Polymers: Functional Surfaces and Supports, Polymer Science: A Comprehensive Reference, vol. 4, 2012, doi:10.1016/B978-0-444-53349-4.00098-4) (Year: 2012).*

(Continued)

*Primary Examiner* — Sally A Merkling
*Assistant Examiner* — Logan Edward Laclair
(74) *Attorney, Agent, or Firm* — Hauptman Ham, LLP

(57) ABSTRACT

Proposed is a carbon dioxide reforming (CDR) reactor having a multilayered catalyst layer arrangement for preventing catalyst deactivation, wherein, in the reactor in which a CDR reaction for reacting methane ($CH_4$) with carbon dioxide ($CO_2$) to reform the methane into a synthesis gas including carbon monoxide (CO) and hydrogen ($H_2$) is
(Continued)

performed, in order to prevent a case where an endothermic reaction between a catalyst and heated reactant gas supplied to the reactor gradually causes the temperature of the reactant gas to decrease and the catalyst is deactivated by cokes generated due to the decrease in temperature of the reactant gas, CDR catalysts in the reactor are arranged in multiple layers in a multilayered structure to allow the reactant gas temperature that has decreased due to the endothermic reaction to be restored in spaces between the catalyst layers.

12 Claims, 6 Drawing Sheets

(51) Int. Cl.
*B01J 23/755* (2006.01)
*B01J 35/00* (2024.01)
*C01B 3/40* (2006.01)
*C01B 32/40* (2017.01)

(52) U.S. Cl.
CPC ............... *C01B 3/40* (2013.01); *C01B 32/40* (2017.08); *C01B 2203/0238* (2013.01); *C01B 2203/0805* (2013.01)

(58) Field of Classification Search
CPC ... C01B 3/40; C01B 32/40; C01B 2203/0238; C01B 2203/0805; C01B 2203/1017; C01B 2203/1052; C01B 2203/1241; C01B 3/38; C01B 2203/1011; C01B 2203/1058; C01B 2203/148; Y02P 20/141; Y02P 20/52

See application file for complete search history.

(56) References Cited

FOREIGN PATENT DOCUMENTS

| JP | 5237789 B2 | 7/2013 |
|---|---|---|
| KR | 10-2006-0063756 A | 6/2006 |
| KR | 10-2008-0060871 A | 7/2008 |
| KR | 10-2014-0140562 A | 12/2014 |
| KR | 10-2017-0060067 A | 5/2017 |

OTHER PUBLICATIONS

International Search Report dated Mar. 3, 2020, in connection with corresponding International Patent Application No. PCT/KR2019/016143.

* cited by examiner

CDR REACTOR HAVING MULTILAYERED CATALYST LAYER ARRANGEMENT FOR PREVENTING CATALYST DEACTIVATION

CROSS-REFERENCE TO RELATED APPLICATION

The present application is a national stage filing under 35 U.S.C § 371 of PCT application number PCT/KR2019/016143 filed on Nov. 22, 2019 which is based upon and claims the benefit of priorities to Korean Patent Application No. 10-2018-0146162, filed on Nov. 23, 2018 in the Korean Intellectual Property Office, which are incorporated herein in their entireties by reference.

TECHNICAL FIELD

The present disclosure relates generally to a carbon dioxide reforming (CDR) reactor having a multilayered catalyst layer arrangement for preventing catalyst deactivation. More particularly, the present disclosure relates to a new CDR reactor structure and a reactor having the same, wherein, in the reactor in which a CDR reaction for reacting methane ($CH_4$) with carbon dioxide ($CO_2$) to reform the methane into a synthesis gas including carbon monoxide (CO) and hydrogen ($H_2$) is performed, in order to prevent a case where an endothermic reaction between a catalyst and heated reactant gas supplied to the reactor gradually causes the temperature of the reactant gas to decrease and the catalyst is deactivated by cokes generated due to the decrease in temperature of the reactant gas, CDR catalysts in the reactor are arranged in multiple layers in a multilayered structure to allow the reactant gas temperature that has decreased due to the endothermic reaction to be restored in spaces between the catalyst layers.

BACKGROUND ART

Carbon dioxide reforming, which is one of the carbon dioxide capture and utilization (CCU) technologies, is an important technology that uses carbon dioxide, which is a major greenhouse gas, and methane, which is the main component of natural gas and shale gas, to convert greenhouse gases into synthesis gas, which is a basic raw material for petrochemicals, without causing additional carbon emissions.

The synthesis gas is a mixed gas composed of carbon monoxide and hydrogen, and is a basic chemical raw material capable of producing high value-added chemicals such as acetic acid, dimethyl ether, and oxo-alcohols through a downstream process.

As such, carbon dioxide reforming of methane yields a product having a high carbon monoxide content ratio, and carbon deposition is also more severe than that of a steam methane reforming (SMR) process.

Therefore, carbon dioxide reforming consumes more energy than the SMR process, but its importance has gradually emerged in that it recycles $CO_2$, which is a greenhouse gas, and can be applied to an oxosynthesis process or a chemical energy transmission system.

However, carbon dioxide reforming is a high endothermic reaction as illustrated in [Reaction Formula 1], and thus, a high reaction temperature is required. At this time, cokes are deposited on the surface of an active material of a catalyst to be used, thereby interfering with a catalytic reaction, or causing deactivation due to a sintering phenomenon in which active components are agglomerated with each other.

$CH_4+CO_2\rightarrow 2H_2+2CO^\Delta H_o$=247.44 kJ/mol  [Reaction Formula 1]

The active material is one of the constituents of the catalyst, and is the most important constituent in the catalyst because a catalytic reaction occurs on the surface of the active material. Coke deposition occurs on the catalyst surface from a direct decomposition reaction of methane ($CH_4$ decomposition: $CH_4\rightarrow C(s)+2H_2$), which is advantageous at high temperatures. In particular, in a conventional carbon dioxide reforming reactor, an endothermic reaction between heated reactant gas and the catalyst causes the temperature in the reactor to decrease below an appropriate reaction temperature, thereby generating cokes due to a decomposition reaction of methane or a disproportionation reaction of carbon monoxide.

Due to the above circumstances, in order to prevent the catalyst from being deactivated by cokes generated as the temperature of the reactant gas decreases due to the endothermic reaction during a carbon dioxide reforming (CDR) reaction, the present disclosure proposes a technique for a new CDR reactor, in which CDR catalysts in the reactor are arranged in multiple layers in a multilayered structure, with spaces defined between the catalyst layers and where no CDR catalysts exists, thereby allowing the reactant gas temperature that has decreased by the endothermic reaction to be restored in spaces between the catalyst layers.

Next, a brief description will be given of the related art existing in the field to which the technology of the present disclosure pertains, and then a description will be given of technical matters that the present disclosure is to achieve differently compared to the related art.

First, in Korean Patent Application Publication No. 10-2014-0140562 A (published on Dec. 9, 2014), there is disclosed a method of producing carbon monoxide and/or hydrogen by alternating operation between two operation modes. More particularly, there is disclosed a technique in which hydrocarbon, water and/or hydrogen, and carbon dioxide are subjected to an endothermic reaction in a flow reactor to form at least carbon monoxide as a product under the effect of heat electrically generated by one or more heating elements, while hydrocarbon, carbon monoxide, and/or hydrogen as reactants are subjected to an exothermic reaction in the flow reactor.

In addition, in Japanese Patent Application Publication No. 2003-212507 A (published on Jul. 30, 2003), there is disclosed a technique in which combustion catalysts are separated depending on the characteristics of a reforming reaction in a plate-type reformer that catalyzes a heat transfer surface, thereby maintaining the temperature in a reactor constant. More particularly, there is disclosed a technique for a reactor configured such that both sides of a heat transfer wall surface are catalyzed to provide a gas passage having one side with a catalyst for exothermic reaction and the other side with a catalyst for endothermic reaction, and reaction heat of the exothermic reaction becomes a heat source of the endothermic reaction, wherein only catalysts for exothermic reaction are separately arranged at an interval in a gas flow direction so that the amount of heat supplied through the heat transfer wall matches the amount of endothermic reaction.

Korean Patent Application Publication No. 10-2014-0140562 A and Japanese Patent Application Publication No. 2003-212507 A, which are patent documents of the related art, use a method of alternately arranging an endothermic reaction layer and an exothermic reaction layer in the reactor as a method of restoring a temperature decreased by an endothermic reaction in a methane reforming reactor. In a reactor for performing only an endothermic reaction without the need for an exothermic reaction, such a reactor structure has a limit in reducing a temperature change due to heat of reaction even in case of the endothermic reaction or the exothermic reaction alone.

Meanwhile, in U.S. Patent Application Publication 2010-0038593 A1 (published on Feb. 18, 2010), there is disclosed a tubular reactor having jet impingement heat transfer, the tubular reactor being used for methane reforming, wherein a plurality of orifices each including a catalyst for performing an endothermic reaction are arranged in a reaction direction, and a heating means is provided in a wall of a tube. Therefore, there are some similarities with the above-described patent documents in terms of the effective aspect that the catalysts are arranged in multiple layers inside the reactor and reactant gas is heated while moving between the catalyst layers. However, this patent document aims to increase the heat transfer of the tubular reactor by converting a flow direction of the reactant gas passing through the tube in an axial direction to a radial direction of the tube in each catalyst layer to cause the reactant gas to hit the wall of the tube. Still, there is a problem in that it is difficult to maintain a uniform temperature throughout the reactor by compensating for a temperature change due to heat of reaction.

DISCLOSURE

Technical Problem

Accordingly, the present disclosure has been made keeping in mind the above problems occurring in the related art, and an objective of the present disclosure is to provide a CDR reactor having a multilayered catalyst layer arrangement for preventing catalyst deactivation, wherein, in the CDR reactor in which reactant gas including methane and carbon dioxide is supplied to an inside of a reactor housing, and the supplied reactant gas comes into contact with catalyst layers to perform a CDR reaction as an endothermic reaction, in order to prevent a catalyst from being deactivated by cokes generated as the temperature of the reactant gas decreases due to the endothermic reaction, a heating means for heating the inside of the reactor housing is included in an inner wall of a reactor housing, and the catalyst layers are arranged in multiple layers so as to be spaced apart from each other at a predetermined interval in a direction from a reactant gas inlet toward an outlet, whereby the temperature of the reactant gas that has decreased due to the endothermic reaction in the catalyst layers is restored to an appropriate reaction temperature through a section between each of the catalyst layers.

Another objective of the present disclosure is to provide technical details on the arrangement of catalyst layers, wherein in arranging the catalyst layers in multiple layers, the catalyst layers are arranged with a thickness and an interval that enable the final conversion rate of reactant gas in a single reactor to be maintained equal to or greater than 90%, while preventing the temperature of the reactant gas from decreasing to equal to or less than 750° C., which obtains the best reforming reaction results, and long-term stability of reaction through the effect of preventing catalyst deactivation.

Technical Solution

In order to accomplish the above objectives, according to an aspect of the present disclosure, there is provided a CDR reactor, including: a reactor housing including a reactant gas inlet formed at a first side thereof and allowing introduction of reactant gas including methane and carbon dioxide, an outlet formed at a second side thereof and allowing discharge of unreacted gas and reaction products, and a heating means provided in a housing wall at a position between the reactant gas inlet and the outlet and heating the reactant gas inside the reactor housing; and a catalytic reaction part provided inside the reactor housing and having a structure in which CDR catalyst layers are arranged in multiple layers in a direction from the reactant gas inlet toward the outlet, wherein in order to prevent a temperature of the reactant gas in the reactor from decreasing to equal to or less than 750° C., while maintaining a final conversion rate of the reactant gas based on methane in a single reactor equal to or greater than 90%, the catalytic reaction part may be configured such that the CDR catalyst layers are arranged in multiple layers so as to be spaced apart from each other at a predetermined interval, and a temperature restoration section having a length equal to the predetermined interval is formed between each of the catalyst layers, wherein in the temperature restoration section, the reactant gas having a decreased temperature due to an endothermic reaction while passing through each of the catalyst layers may be reheated by the heating means.

Furthermore, in an embodiment, the CDR catalyst layers may be configured to have thicknesses equal or increased in the direction from the reactant gas inlet toward the outlet, and the respective temperature restoration sections may be configured to have lengths equal or decreased in the direction from the reactant gas inlet toward the outlet.

Furthermore, in an embodiment, the catalytic reaction part may be configured such that when a region in which thicknesses of adjacent catalyst layers are equal to each other exists, lengths of the temperature restoration sections may be decreased in the region in the direction from the reactant gas inlet toward the outlet.

Furthermore, in an embodiment, the catalytic reaction part may be configured such that when a region in which lengths of adjacent temperature restoration sections are equal to each other exists, thicknesses of the CDR catalyst layers may be increased in the region in the direction from the reactant gas inlet toward the outlet.

Furthermore, in an embodiment, each of the CDR catalyst layers may include a catalyst having a monolithic structure including nickel, cobalt, ruthenium, and zirconium Furthermore, in an embodiment, the catalytic reaction part may be configured such that a catalyst layer with which the reactant gas firstly comes into contact may be spaced apart from the reactant gas inlet to allow the reactant gas to be preheated to a reaction temperature.

Furthermore, in an embodiment, arrangement of the catalytic reaction part may be such that the CDR catalyst layers may be arranged in multiple layers so as to be spaced apart from each other at the predetermined interval in order to prevent the temperature of the reactant gas from decreasing to equal to or less than 800° C., and the interval between each of the catalyst layers may become the temperature restoration section where the temperature of the reactant gas is restored to an initial temperature.

According to another aspect of the present disclosure, there is provided a carbon dioxide reforming method of methane using a multilayered catalyst layer arrangement for preventing catalyst deactivation, the carbon dioxide reforming method including: supplying reactant gas into a reactor housing, the reactor including a reactant gas inlet formed at a first side thereof and allowing introduction of the reactant gas including methane and carbon dioxide, an outlet formed at a second side thereof and allowing discharge of unreacted gas and reaction products, and a heating means provided in a housing wall at a position between the reactant gas inlet and the outlet; performing a CDR reaction as the reactant gas comes into contact with each of CDR catalyst layers, the catalyst layers being arranged in multiple layers in the reactor housing so as to be spaced apart from each other at a predetermined interval in a direction from the reactant gas inlet toward the outlet in order to prevent a temperature of the reactant gas from decreasing to equal to or less than 750° C. while maintaining a final conversion rate of the reactant gas based on methane in a single reactor equal to or greater than 90%; reheating, by the heating means, the reactant gas having a decreased temperature due to an endothermic reaction while passing through each of the catalyst layers in each of spaces, each space being defined between each of the catalyst layers as a result of arranging the CDR catalyst layers in multiple layers so as to be spaced apart from each other at the predetermined interval; and discharging unreacted gas and reaction products through the outlet, wherein the performing of the CDR reaction and the reheating of the reactant gas may be alternately performed a number of times equal to the number of the CDR catalyst layers arranged in multiple layers.

Furthermore, in an embodiment, the performing of the CDR reaction may be performed in each of the CDR catalyst layers, each CDR catalyst layer including a catalyst having a monolithic structure including nickel, cobalt, ruthenium, and zirconium.

Furthermore, in an embodiment, in the performing of the CDR reaction, the CDR catalyst layers may be arranged in multiple layers so as to be spaced apart from each other at the predetermined interval in order to prevent the temperature of the reactant gas from decreasing to equal to or less than 800° C., and the interval between each of the catalyst layers may become a temperature restoration section where the temperature of the reactant gas is restored to an initial temperature.

Advantageous Effects

In the present disclosure, in arranging catalyst layers in multiple layers as described above, the thicknesses the catalyst layers are configured to be equal or increased in a direction from a reactant gas inlet toward an outlet, and the lengths of intervals between the catalyst layers are configured to be equal or decreased in the direction from the reactant gas inlet toward the outlet, whereby it is possible to prevent the temperature of reactant gas from decreasing to equal to or less than 750° C., while maintaining the final conversion rate of the reactant gas in a single reactor equal to or greater than 90%, thereby simultaneously realizing a high conversion rate and long-term stability of catalyst while completing a reaction in a single reactor.

BEST MODE

Hereinafter, an exemplary embodiment of a CDR reactor having a multilayered catalyst layer arrangement for preventing catalyst deactivation according to the present disclosure will be described in detail with reference to the accompanying drawings so as to be easily implemented by those skilled in the art.

In each drawing of the present disclosure, sizes or scales of components may be enlarged or reduced compared to their actual sizes or scales for better illustration, and known components are not depicted therein to clearly show features of the present disclosure. Therefore, the present disclosure is not limited to the drawings.

When describing the principle of the embodiment of the present disclosure in detail, details of well-known functions and features may be omitted to avoid unnecessarily obscuring the subject matter of the present disclosure.

Specific structural and functional descriptions of embodiments of the present disclosure disclosed herein are only for illustrative purposes of the preferred embodiments of the present disclosure, and the present description is not intended to represent all of the technical spirit of the present disclosure. Accordingly, the present disclosure is intended to cover not only the exemplary embodiment, but also various alternatives, modifications, equivalents and other embodiments that may be included within the spirit and scope of the present disclosure as defined by the appended claims.

The present disclosure relates to a carbon dioxide reforming (CDR) reactor having a multilayered catalyst layer arrangement for preventing catalyst deactivation and to a carbon dioxide reforming method using the multilayered catalyst layer arrangement, wherein, in the reactor in which a CDR reaction for reacting methane ($CH_4$) with carbon dioxide ($CO_2$) to reform the methane into a synthesis gas including carbon monoxide (CO) and hydrogen ($H_2$) is performed, in order to prevent a case where an endothermic reaction between a catalyst and heated reactant gas supplied to the reactor gradually causes the temperature of the reactant gas to decrease, and the catalyst is deactivated by cokes generated due to the decrease in temperature of the reactant gas, CDR catalysts in the reactor are arranged in multiple layers in a multilayered structure to allow the reactant gas temperature that has decreased due to the endothermic reaction to be restored in spaces between the catalyst layers.

Hereinafter, configurations and examples of the CDR reactor having the multilayered catalyst layer arrangement for preventing catalyst deactivation according to the present disclosure will be described in detail with reference to the drawings.

Figure 1:
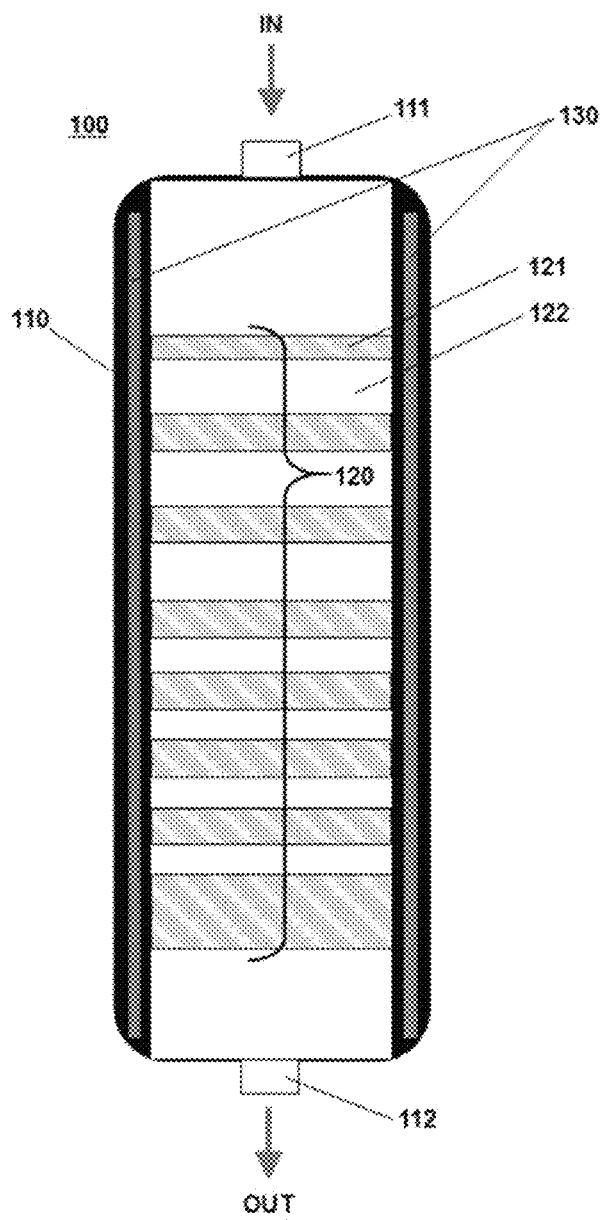
FIG. 1 is a sectional view illustrating the structure of a CDR reactor having a multilayered catalyst layer arrangement for preventing catalyst deactivation according to an embodiment of the present disclosure.

FIG. 1 is a sectional view illustrating the structure of a CDR reactor having a multilayered catalyst layer arrangement for preventing catalyst deactivation according to an embodiment of the present disclosure.

As illustrated in FIG. 1, the CDR reactor 100 according to the present disclosure includes a reactor housing 110, and a catalytic reaction part 120 provided inside the reactor housing 110 and having multilayered catalyst layers 121.

More specifically, the reactor housing 110 includes a reactant gas inlet 111 formed at a first side thereof and allowing introduction of reactant gas including methane and carbon dioxide, an outlet 112 formed at a second side thereof and allowing discharge of unreacted gas and reaction products, and a heating means 130 provided in a housing wall at a position between the reactant gas inlet and the outlet and heating the reactant gas inside the reactor housing.

In addition, the catalytic reaction part 120 has a structure in which the CDR catalyst layers 121, which serve as catalysts for reacting methane in the reactant gas with carbon dioxide and reforming the methane into a synthesis gas, are arranged in multiple layers in a direction from the reactant gas inlet toward the outlet, and each of the CDR catalyst layers 121 includes a catalyst having a monolithic structure including nickel, cobalt, ruthenium, and zirconium.

In addition, in the catalytic reaction part 120, on the basis of when the CDR catalysts are fresh catalysts in a state before the reaction, while maintaining a final conversion rate of the reactant gas based on methane equal to or greater than 90% in a single reactor, in order to prevent the temperature of the reactant gas from decreasing to equal to or less than 750° C., more preferably, equal to or less than 800° C., the CDR catalyst layers are arranged in multiple layers so as to be spaced apart from each other at a predetermined interval, and a temperature restoration section having a length equal to the predetermined interval is formed between each of the catalyst layers.

Herein, the final conversion rate of the reactant gas based on methane in the single reactor refers to a methane conversion rate measured at the outlet of the single reactor, and refers to a value measured in a fresh state before catalyst deactivation occurs.

For reference, in the CDR reactor, when the temperature of the reactant gas decreases to equal to or less than 750° C., a coke generation rate increases rapidly, and the catalysts are deactivated due to cokes generated in a large amount.

That is, in the CDR reactor according to the present disclosure, the reactant gas having a decreased temperature due to the endothermic reaction while passing through each of the catalyst layers is reheated by the heating means in each of the respective temperature restoration sections 122, which are spaces between the catalyst layers. Each of the temperature restoration sections 122 may be an empty space, or may be filled with a temperature transfer medium to facilitate temperature transfer. The temperature transfer medium may be, for example, alumina, silica, monolith, or a metal ball.

In addition, in general, due to the nature of the CDR reaction, the number of reactant gases participating in the reaction decreases toward a rear end of the reactor, and thus, the decrease in the reactant gas temperature due to the endothermic reaction decreases. Therefore, in the CDR reactor according to the present disclosure, in performing the CDR reaction in the reactor, by configuring the CDR catalyst layers to have thicknesses equal or increased in the direction from the reactant gas inlet toward the outlet, while configuring the temperature restoration sections to have lengths equal or decreased in the direction from the reactant gas inlet toward the outlet, it is possible to maintain the conversion rate of the reactant gas and the temperature thereof.

More specifically, when a region in which the thicknesses of the CDR catalyst layers are equal to each other exists, the lengths of the temperature restoration sections are decreased in the region in the direction from the reactant gas inlet toward the outlet. On the other hand, when a region in which the lengths of the temperature restoration sections are equal to each other exists, the thicknesses of the CDR catalyst layers are increased in the region in the direction from the reactant gas inlet toward the outlet. Thereby, as it goes to the rear end of the reactor, a contact time between the reactant gas and the catalysts is increased and a temperature restoration time is decreased, which makes it possible to stably maintain reactant gas conversion rate and temperature at a front end of the reactor until the reactant gas reaches the rear end of the reactor.

Figure 2:
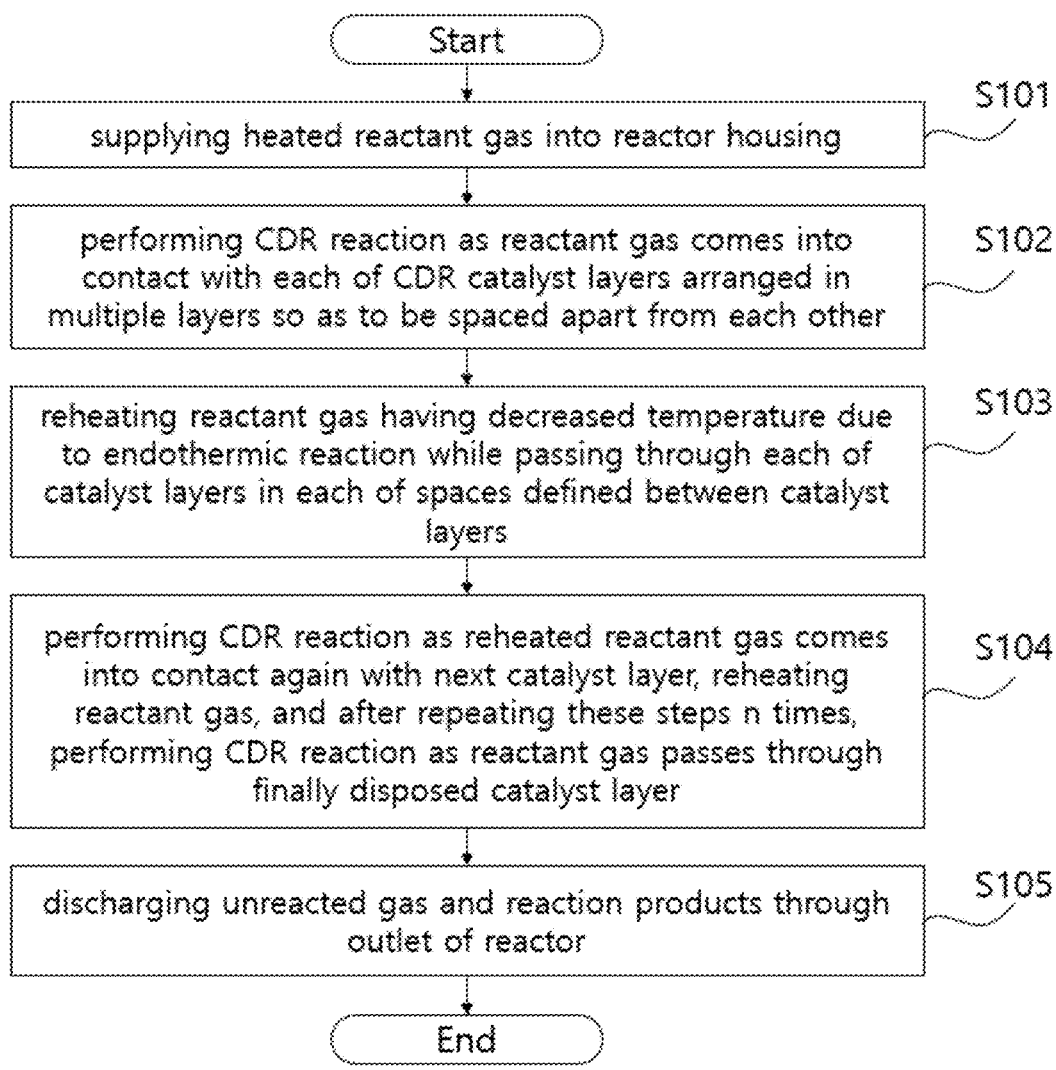
FIG. 2 is a flowchart illustrating a carbon dioxide reforming method using a multilayered catalyst layer arrangement for preventing catalyst deactivation according to another embodiment of the present disclosure.

FIG. 2 is a flowchart illustrating a carbon dioxide reforming method using a multilayered catalyst layer arrangement for preventing catalyst deactivation according to another embodiment of the present disclosure.

As illustrated in FIG. 2, in the carbon dioxide reforming method using the multilayered catalyst layer arrangement for preventing catalyst deactivation according to the present disclosure, first, reactant gas is supplied into a reactor housing, the reactor housing including a reactant gas inlet formed at a first side thereof and allowing introduction of the reactant gas including methane and carbon dioxide, an outlet formed at a second side thereof and allowing discharge of unreacted gas and reaction products, and a heating means provided in a housing wall at a position between the reactant gas inlet and the outlet (step S101).

The reactant gas comes into contact with each of CDR catalyst layers to perform a CDR reaction, the catalyst layers being arranged in multiple layers in the reactor housing so as to be spaced apart from each other at a predetermined interval in a direction from the reactant gas inlet toward the outlet to prevent the temperature of the reactant gas from decreasing to equal to or less than 750° C. (step S102).

The reactant gas having a decreased temperature due to an endothermic reaction while passing through each of the catalyst layers is reheated by the heating means in each of spaces, each space being defined between each of the catalyst layers as a result of arranging the CDR catalyst layers in multiple layers so as to be spaced apart from each other at the predetermined interval (step S103).

The reheated reactant gas comes into contact again with a next catalyst layer to perform a CDR reaction, and the reactant gas is reheated. After repeating these steps n times, the reactant gas passes through a finally disposed catalyst layer to perform a CDR reaction (step S104).

Finally, unreacted gas and reaction products are discharged through the outlet of the reactor (step S105).

In addition, in the carbon dioxide reforming method using the multilayered catalyst layer arrangement for preventing catalyst deactivation, the performing of the CDR reaction and the reheating of the reactant gas are alternately performed a number of times equal to the number of the CDR catalyst layers arranged in multiple layers. The CDR reaction is performed in CDR catalyst layers having thicknesses equal or increased in the direction from the reactant gas inlet toward the outlet, and the reheating of the reactant gas having a decreased temperature due to the CDR reaction is performed in a space (temperature restoration section) between each of the catalyst layers in which the CDR reaction occurs. At this time, the respective spaces between the catalyst layers are arranged so that the lengths thereof are equal or decreased in the direction from the reactant gas inlet toward the outlet.

Furthermore, when a region in which the thicknesses of two adjacent catalyst layers are equal to each other among the CDR catalyst layers exists, the lengths of the temperature restoration sections are decreased in the region in the direction from the reactant gas inlet toward the outlet. On the other hand, when a region in which the lengths of two adjacent temperature restoration sections are equal to each other exists, the thicknesses of the CDR catalyst layers are increased in the region in the direction from the reactant gas inlet toward the outlet. Thereby, it is possible to stably maintain reactant gas conversion rate and temperature.

Figure 3:
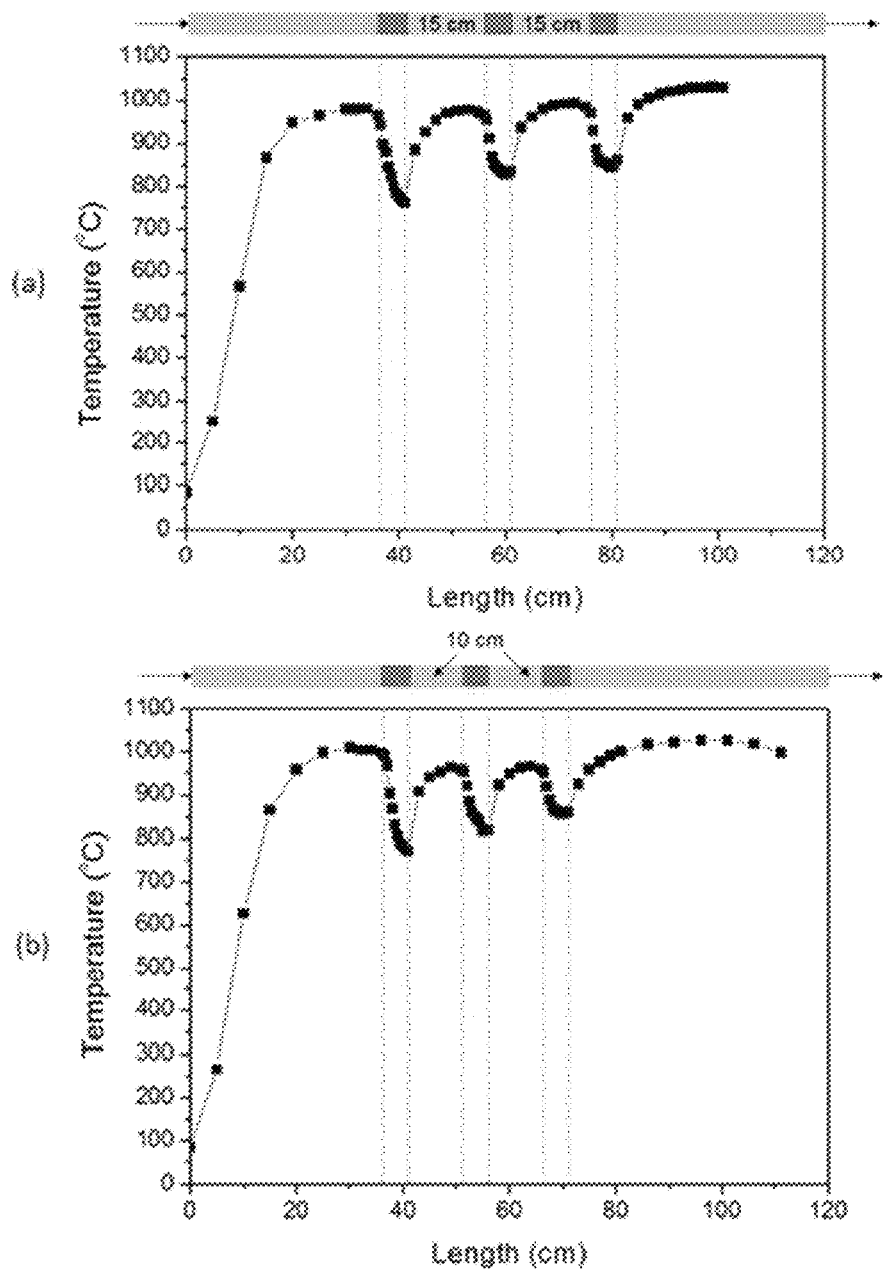
FIG. 3 is a view illustrating graphs of a change in reaction temperature in the reactor according to length of a temperature restoration section in the CDR reactor having the multilayered catalyst layer arrangement for preventing catalyst deactivation according to the present disclosure.

FIG. 3 is a view illustrating graphs of a change in temperature when temperature restoration sections are formed between three catalyst layers, in which FIG. 3(a) illustrates a case where the catalyst layers are arranged with the temperature restoration sections each having a length of 15 cm, and FIG. 3(b) illustrates a case where the catalyst layers are arranged with the temperature restoration sections each having a length of 10 cm.

As can be seen in the graph of FIG. 3(a), by separately arranging the catalyst layers in multiple layers so that unlike a conventional CDR reactor in which a reaction is performed one time, a reaction is performed several times at a short interval, it is possible to prevent the temperature of the reactant gas from decreasing to equal to or less than 750° C. In addition, in the temperature restoration sections between the catalyst layers, by reheating the reactant gas that has passed through the catalyst layers using the heating means in the housing wall of the reactor, it is possible to restore the temperature of the reactant gas to an initial temperature.

On the other hand, the graph of FIG. 3 (b) illustrates a reaction performed under the same conditions as in the graph of FIG. 3(a) above, in which the lengths of the temperature restoration sections are decreased. As such, when the temperature restoration sections are not sufficient, it is impossible to restore the temperature of the reactant gas to a temperature at which a reforming reaction is started again.

Meanwhile, the reason that a decrease in reaction temperature becomes small toward a later stage of the reaction in FIG. 3 is that a pure reactant is injected into a first catalyst layer, so the reaction is rapid, with the result that unreacted methane and carbon dioxide, and produced hydrogen and carbon monoxide coexist at a lower end of the first catalyst layer. For this reason, in the second catalyst layer, a reforming reaction of methane, which has a relatively low concentration compared to the first catalyst layer, with carbon dioxide is performed, and thus, the decrease in reaction temperature is small compared to the first catalyst layer. As such, since the decrease in reaction temperature becomes small toward the later stage of the reaction, considering this when arranging the catalyst layers, it is possible to increase the thicknesses of the catalyst layers toward a rear end of the reactor to obtain a higher conversion rate.

Hereinafter, the effect of the CDR reactor having the multilayered catalyst layer arrangement for preventing catalyst deactivation according to the present disclosure will be described through experiments.

Experimental Examples 1 to 5

Figure 4:
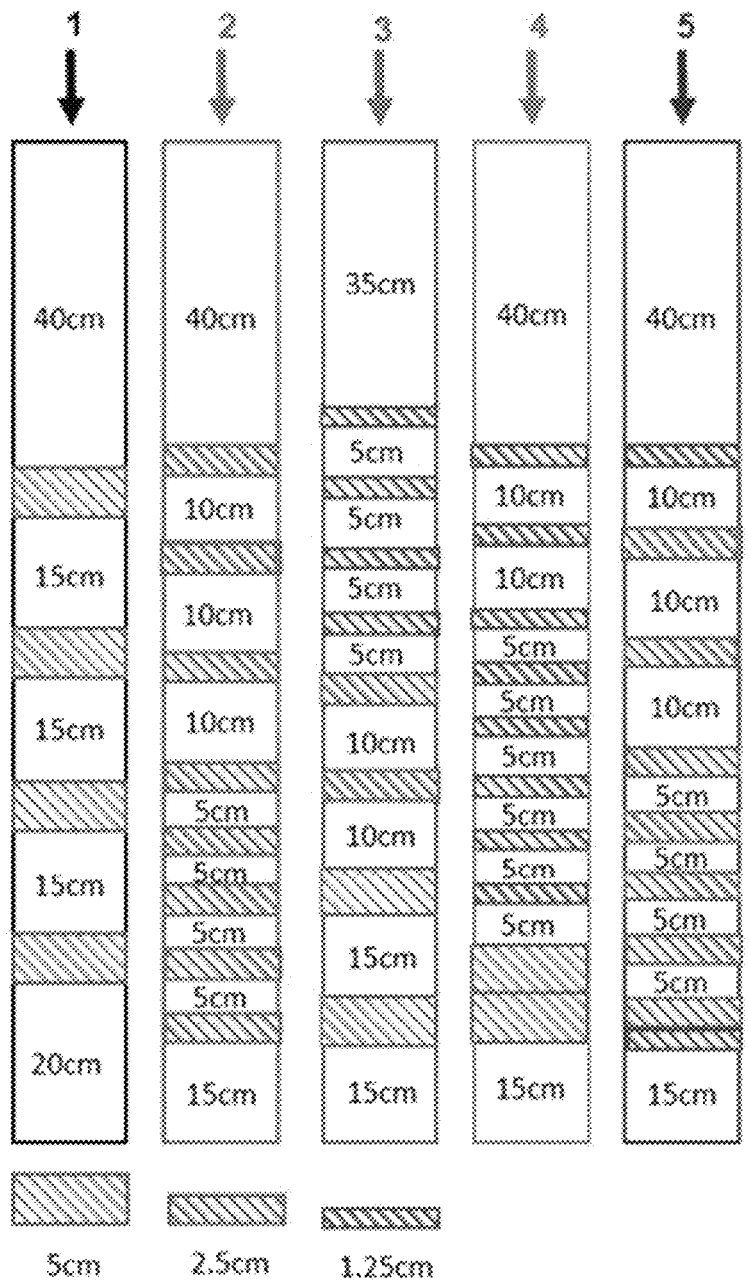
FIG. 4 is a reference diagram illustrating catalyst thickness and interval in the arrangement of catalyst layers of Experimental Examples 1 to 5 of the present disclosure.

In a cylindrical reactor having a diameter of 1 inch, catalysts were separately arranged as illustrated in FIG. 4, while constant heating was performed from the outside of the reactor. Reactant gas was heated by an electric furnace surrounding the entire outside of the reactor, and the temperature of the reactant gas was maintained at 1000° C. before firstly coming into contact with catalyst layers. As each of the catalysts, a NiCoRuZr/Monolith (200 CPI) catalyst coated so that 2 wt % of active metals of Ni, Co, Ru, and Zr are supported on a ceramic monolith was used. The ratio between Ni+Co, Ru, and Zr used as the active metals was 74.3:0.7:25, and the molar ratio between the used Ni and Co was 1:1. As the reactant gas, a mixed gas in which $CH_4$ and $CO_2$ were mixed at a molar ratio of 1:1 was used, SV=4,425 h-1, and the total flow rate of the reactant gas was 5.6 L/min.

Figure 5:
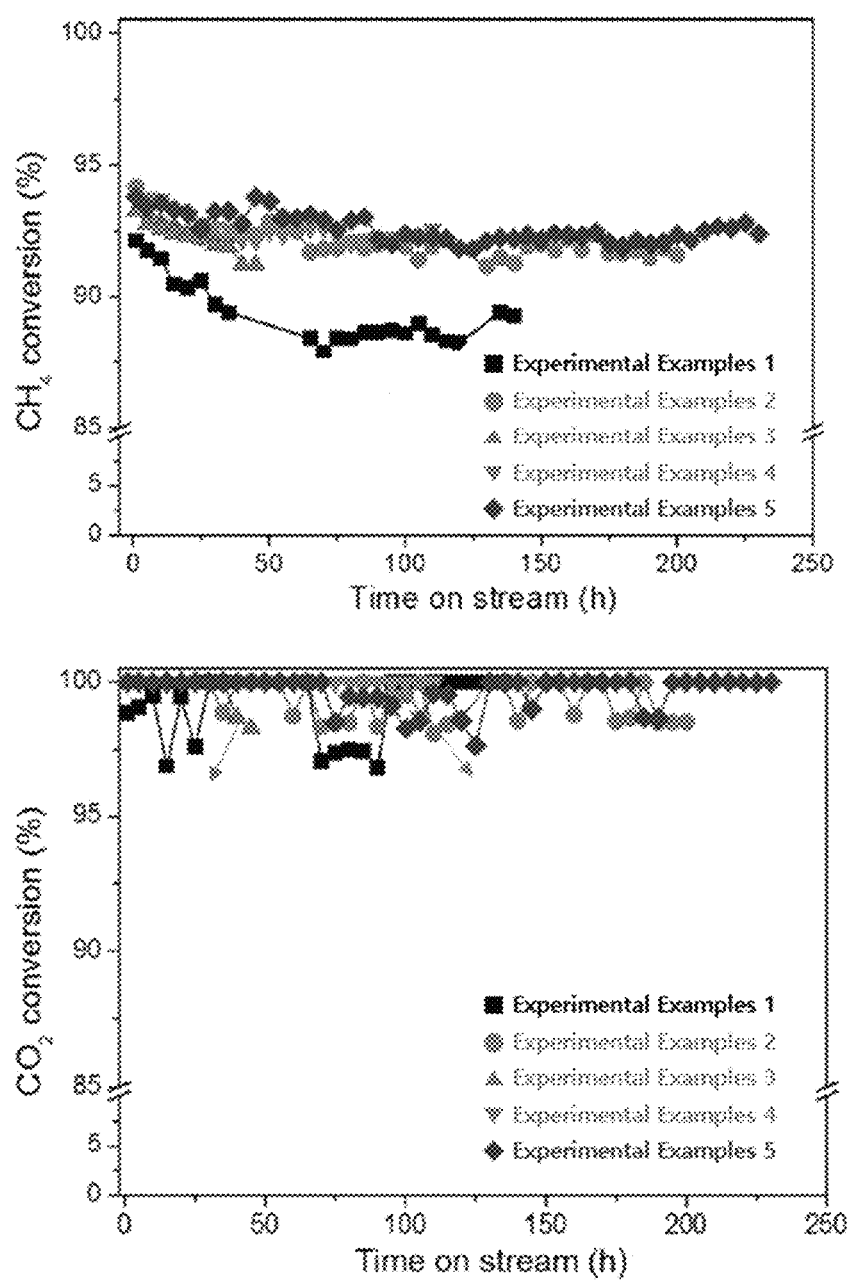
FIG. 5 is a view illustrating graphs of conversion rate and long-term stability of the CDR reactor having the multilayered catalyst layer arrangement for preventing catalyst deactivation according to Experimental Examples 1 to 5 of the present disclosure.

The reaction results are illustrated in FIG. 5.

Figure 6:
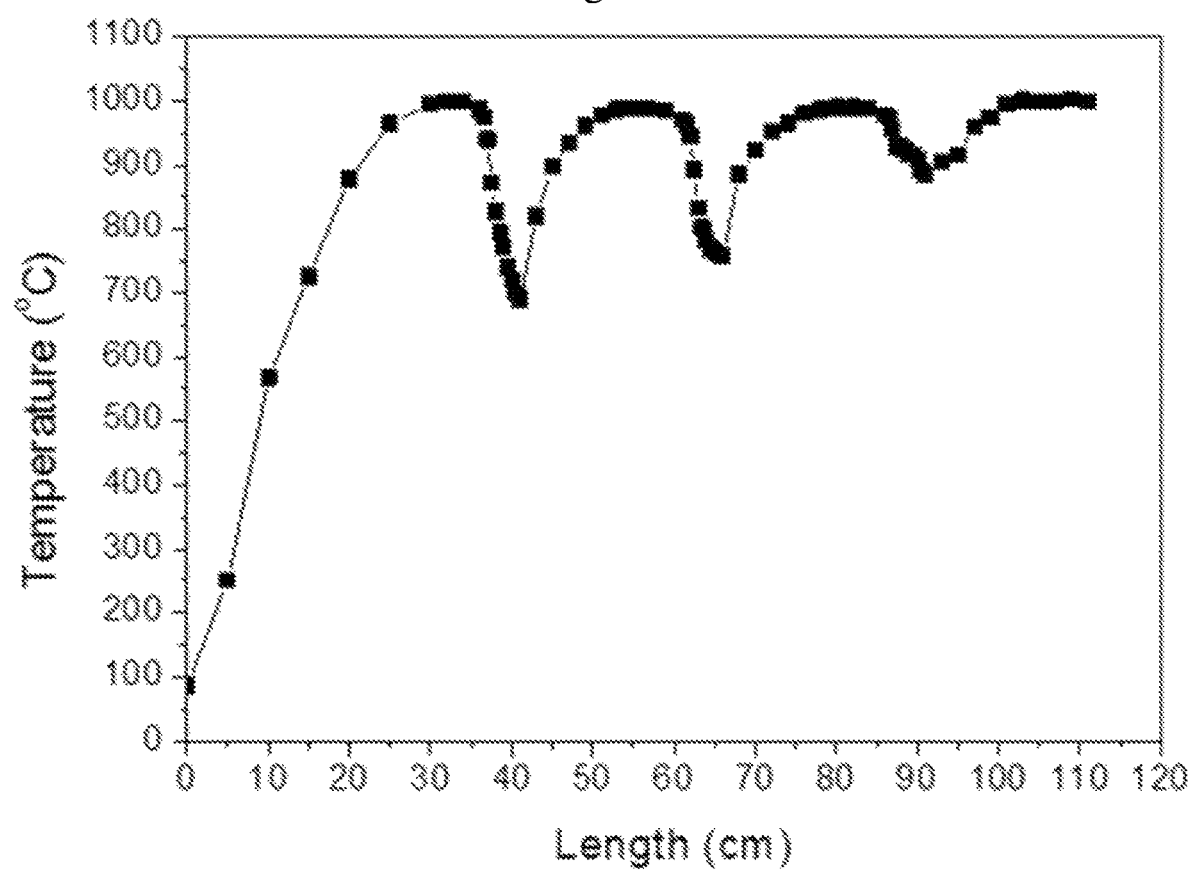
FIG. 6 is a graph of a change in reaction temperature first to third catalyst layers in Experimental Example 1 of the present disclosure.

From the results illustrated in FIG. 5, it can be seen that in Experimental Example 1, although catalyst layers were separately arranged, a decrease in methane conversion rate over time was relatively large, and about 30 hours after a reaction started, the methane conversion rate decreased to equal to or less than 90%. FIG. 6 is a graph of a change in reaction temperature of first to third catalyst layers in Experimental Example 1. From the results illustrated in this figure, it can be seen that in Experimental Example 1, the methane conversion rate decreased after a predetermined period of time although the catalyst layers were separately arranged. This is because, with the use of 5 cm thick monolith catalysts, the temperature of a first catalyst layer with which reactants firstly come into contact decreased to equal to or less than 700° C., and at a low reaction temperature, a relatively large amount of carbon was deposited in the catalyst layer due to carbon deposition due to a decomposition reaction of methane, and disproportionation of carbon monoxide, resulting in deteriorating a catalytic reaction over time.

On the other hand, in Experimental Examples 2 to 5, catalyst layers were arranged so that the thicknesses thereof were equal or increased in a direction from a reactant gas inlet toward an outlet, and 2.5 cm or 1.25 cm thick monolith catalysts obtained by equally separating a 5 cm thick monolith catalyst into ½ or ¼ were used to control a reaction degree of an uppermost catalyst layer to control a temperature decrease of the catalyst layer, and at the same time, the lengths of catalyst layer intervals (temperature restoration sections) were configured to be equal or decreased in the direction from the reactant gas inlet toward the outlet. Thereby, it can be seen that a high conversion rate and long-term stability were exhibited in terms of conversion of methane and carbon dioxide.

Although the present disclosure has been described for illustrative purposes with reference to the embodiments illustrated in the accompanying drawings, those skilled in the art will appreciate that various modifications, equivalents, and other embodiments are possible, without departing from the scope and spirit of the present disclosure. Accordingly, the scope of the present disclosure should be determined by the following claims.

The invention claimed is:

1. A CDR (carbon dioxide reaction) reactor, comprising:
   a reactor housing including a reactant gas inlet formed at a first side thereof and allowing introduction of reactant gas including methane and carbon dioxide, an outlet formed at a second side thereof and allowing discharge of unreacted gas and reaction products, and a heating means provided in a housing wall at a position between the reactant gas inlet and the outlet and heating the reactant gas inside the reactor housing; and
   a catalytic reaction part provided inside the reactor housing and having a structure in which CDR catalyst layers are arranged in multiple layers in a direction from the reactant gas inlet toward the outlet, wherein in order to prevent a temperature of the reactant gas in the reactor from decreasing to equal to or less than 750° C., while maintaining a final conversion rate of the reactant gas based on methane in a single reactor equal to or greater than 90%, the catalytic reaction part is configured such that the CDR catalyst layers are arranged in multiple layers so as to be spaced apart from each other at a predetermined interval, and a temperature restoration section having an empty space with a length equal to the predetermined interval is formed between each of the catalyst layers, wherein in the temperature restoration section, the reactant gas having a decreased temperature due to an endothermic reaction while passing through each of the catalyst layers is reheated by the heating means, the catalytic reaction part is configured such that, when a region in which the thicknesses of 2 catalyst layers, separated by the temperature restoration section, are equal exists, the lengths of the temperature restoration sections in that region, in the direction from the reactant gas inlet toward the outlet, are either the same or decreased, and decrease at least once, the catalytic reaction part is configured such that, when a region in which the lengths of 2 temperature restoration sections, separated by the catalyst layer, are equal exists, the thicknesses of the CDR catalyst layers in that region, in the direction from the reactant gas inlet toward the outlet, are either the same or increased, and increase at least once, each of the CDR catalyst layers is coated with a catalyst having a monolithic structure of ceramic material, the CDR catalyst layers include at least first, second, third, and fourth CDR catalyst layers in sequence, with the first catalyst layer being closest to the reactant gas inlet, and for at least the first, second, and third CDR catalyst layers, the immediately-following downstream temperature restoration section has a length that is greater than or equal to four times the thickness of the corresponding CDR catalyst layer.

2. The CDR reactor of claim 1, wherein the catalyst comprises nickel, cobalt, ruthenium, and zirconium.

3. The CDR reactor of claim 2, wherein arrangement of the catalytic reaction part is such that the CDR catalyst layers are arranged in multiple layers so as to be spaced apart from each other at the predetermined interval in order to prevent the temperature of the reactant gas from decreasing to equal to or less than 800° C., and the interval between each of the catalyst layers becomes the temperature restoration section where the temperature of the reactant gas is restored to an initial temperature.

4. The CDR reactor of claim 1, wherein the catalytic reaction part is configured such that a catalyst layer with which the reactant gas firstly comes into contact is spaced apart from the reactant gas inlet to allow the reactant gas to be preheated to a reaction temperature.

5. The CDR reactor of claim 4, wherein arrangement of the catalytic reaction part is such that the CDR catalyst layers are arranged in multiple layers so as to be spaced apart from each other at the predetermined interval in order to prevent the temperature of the reactant gas from decreasing to equal to or less than 800° C., and the interval between each of the catalyst layers becomes the temperature restoration section where the temperature of the reactant gas is restored to an initial temperature.

6. The CDR reactor of claim 1, wherein arrangement of the catalytic reaction part is such that the CDR catalyst layers are arranged in multiple layers so as to be spaced apart from each other at the predetermined interval in order to prevent the temperature of the reactant gas from decreasing to equal to or less than 800° C., and the interval between each of the catalyst layers becomes the temperature restoration section where the temperature of the reactant gas is restored to an initial temperature.

7. The CDR reactor of claim 1, wherein arrangement of the catalytic reaction part is such that the CDR catalyst layers are arranged in multiple layers so as to be spaced apart from each other at the predetermined interval in order to prevent the temperature of the reactant gas from decreasing to equal to or less than 800° C., and the interval between each of the catalyst layers becomes the temperature restoration section where the temperature of the reactant gas is restored to an initial temperature.

8. The CDR reactor of claim 1, wherein:
the CDR reactor is configured such that an endothermic reaction of the reactant gas occurs therein,
a plurality of temperature restoration sections are arranged between a first CDR catalyst layer that is closest to the reactant gas inlet and a second CDR catalyst layer that is closest to the outlet,
the plurality of temperature restoration sections between the first and second CDR catalyst layers includes a first temperature restoration section and a second temperature restoration section, the first temperature restoration being closer to the reactant gas inlet than the second temperature restoration section, and
the second temperature restoration section is longer than the first temperature restoration section.

9. A carbon dioxide reforming method of methane using a multilayered catalyst layer arrangement for preventing catalyst deactivation, the carbon dioxide reforming method comprising:
supplying reactant gas into a reactor housing, the reactor including a reactant gas inlet formed at a first side thereof and allowing introduction of the reactant gas including methane and carbon dioxide, an outlet formed at a second side thereof and allowing discharge of unreacted gas.

10. The carbon dioxide reforming method of claim 9, wherein the performing of the CDR reaction is performed in each of the CDR catalyst layers, each CDR catalyst layer comprising a catalyst having a monolithic structure including nickel, cobalt, ruthenium, and zirconium.

11. The carbon dioxide reforming method of claim 9, wherein in the performing of the CDR reaction, the CDR catalyst layers are arranged in multiple layers so as to be spaced apart from each other at the predetermined interval in order to prevent the temperature of the reactant gas from decreasing to equal to or less than 800° C., and the interval between each of the catalyst layers becomes a temperature restoration section where the temperature of the reactant gas is restored to an initial temperature.

12. The carbon dioxide reforming method of claim 9, wherein:
the reactor housing is configured such that an endothermic reaction of the reactant gas occurs therein,
a plurality of temperature restoration sections are arranged between a first CDR catalyst layer that is closest to the reactant gas inlet and a second CDR catalyst layer that is closest to the outlet,
the plurality of temperature restoration sections between the first and second CDR catalyst layers includes a first temperature restoration section and a second temperature restoration section, the first temperature restoration being closer to the reactant gas inlet than the second temperature restoration section, and the second temperature restoration section is longer than the first temperature restoration section.

\* \* \* \* \*